US006753911B1

(12) United States Patent
Yamada et al.

(10) Patent No.: US 6,753,911 B1
(45) Date of Patent: Jun. 22, 2004

(54) ZOOMING LENS BARREL AND A CAMERA IN USE THEREWITH

(75) Inventors: Tomokazu Yamada, Hachioji (JP); Yoshio Shimazaki, Hachioji (JP); Yoshiharu Takahashi, Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/491,741

(22) Filed: Jan. 27, 2000

(30) Foreign Application Priority Data

Jan. 28, 1999 (JP) .......................................... 11-020106

(51) Int. Cl.[7] .................. H04N 5/262; H04N 5/225; G02B 15/14; G03B 17/00
(52) U.S. Cl. .................. 348/240.3; 348/335; 359/701; 396/85
(58) Field of Search .................. 340/240.99, 240.3, 340/335, 357, 374; 359/363, 700, 701, 702, 703, 704, 695; 396/85, 86, 87, 75

(56) References Cited

U.S. PATENT DOCUMENTS

| | | | | | |
|---|---|---|---|---|---|
| 4,911,542 A | * | 3/1990 | Nishio et al. | ............... | 359/701 |
| 5,018,843 A | * | 5/1991 | Inadome et al. | ............ | 359/684 |
| 5,270,868 A | * | 12/1993 | Nomura | ..................... | 359/700 |
| 5,687,029 A | * | 11/1997 | Omi et al. | .................. | 359/700 |
| 5,764,937 A | * | 6/1998 | Machida | ..................... | 396/85 |
| 5,771,409 A | * | 6/1998 | Nishimura | .................. | 359/704 |
| 5,801,888 A | * | 9/1998 | Machida et al. | ............ | 359/701 |
| 5,815,744 A | * | 9/1998 | Ohmiya | ...................... | 396/85 |
| 5,861,998 A | * | 1/1999 | Nishimura | .................. | 359/700 |
| 5,983,033 A | * | 11/1999 | Yamazaki et al. | ........... | 396/85 |
| 6,115,191 A | * | 9/2000 | Ito et al. | .................... | 359/700 |
| 6,661,589 B2 | * | 12/2003 | Takanashi et al. | .......... | 359/819 |
| 2002/0018140 A1 | * | 2/2002 | Suemoto et al. | ............ | 348/347 |

* cited by examiner

Primary Examiner—Wendy R. Garber
Assistant Examiner—John Villecco
(74) Attorney, Agent, or Firm—Cantor Colburn LLP

(57) ABSTRACT

A camera having a zooming function, including plural lens groups, a fixed frame fixed to a main body of the camera, a cam member engaging with the fixed frame so that the cam member is movable in the optical axis direction of the lens groups, and plural lens group supporting frames each engaging with the cam member and supporting each of the plural lens groups so that the lens group supporting frames may move in the optical axis direction to move the lens groups in the optical axis direction.

24 Claims, 6 Drawing Sheets

ZOOMING LENS BARREL AND A CAMERA IN USE THEREWITH

BACKGROUND OF THE INVENTION

The present invention relates to a zoom lens barrel and a camera employing the zoom lens barrel, and more particularly, to a zoom lens barrel having therein a zooming region and an accommodating region and to a camera such as a digital camera and a video camera employing this zoom lens barrel.

As a zoom lens barrel, there has so far been a barrel which conducts a change of a focal length of a lens system and an accommodating action. For example, FIG. 6 shows constitution for a change of a focal length and an accommodating action in a zoom lens barrel representing an example of a prior art. As shown in the diagram, cam member 151 is provided with cam grooves 152 and 153. The cam groove 152 is engaged with pin 172 which is provided on lens supporting frame 171 having therein lens group 173, and the cam groove 153 is engaged with pin 182 which is provided on lens supporting frame 181 having therein lens group 183.

The pins 172 and 182 are engaged also with linear guide groove 161, and when the cam member 151 is turned in the direction of arrow mark A, the lens supporting frames 171 and 181 are guided by the linear groove 161 representing a guide member to move in the direction of arrow mark B. The cam grooves 152 and 153 make zooming action to be conducted by the portions of position P1 and position P2, and make accommodating action to be conducted by the portions of position P2 and position P3 (TOKKAIHEI No. 2-6914).

However, since each of the cam grooves 152 and 153 on the cam member 151 has a groove portion for zooming and a groove portion for accommodating, the cam grooves 152 and 153 are long in the direction which is in parallel with an optical axis. In particular, for those wherein an optical system such as CCD is required to have telecentric characteristics in an image pickup element, the position of a lens in the course of photographing is far from CCD in the direction which is in parallel with an optical axis in many cases. Therefore, an amount of movement for accommodating is large, and thereby, cam grooves 152 and 153 are long in the direction being in parallel with an optical axis, which is a problem. Further, in the high magnification zoom lens wherein a lens group moves in full measure in the direction being in parallel with an optical axis between the occasion of accommodating and that of photographing, in particular, cam grooves 152 and 153 are long in the direction being in parallel with an optical axis, and a total length in the case of accommodating is long, which is a problem.

To prevent an error of lens inclination to an optical axis of an optical system, it is usually preferable to arrange three cam grooves. However, when the cam grooves are long as stated above, a diameter of a cam member is increased and a rise angle of the cam groove is made to be steep, for providing three cam grooves without an interference, which causes a problem that load on the driving section is increased.

SUMMARY OF THE INVENTION

The invention has been achieved in view of the problems stated above, and one of objects of the invention is to provide a zoom lens barrel which can easily be applied to a camera excellent in portability, by making a zoom lens which causes a camera to be large in size to be accommodated easily in a camera main body. Another object of the invention is to provide a camera to which the barrel stated above is applied.

The objects mentioned above are attained by either one of the following structures.

(1) A camera having a zooming function wherein there are provided a plurality of lens groups, a fixed frame fixed to a main body of the camera, a cam member engaging with the fixed frame so that the cam member is moveable in the optical axis direction, and a plurality of lens group supporting frames each engaging with the cam member and supporting each of the plural lens groups so that the lens group supporting frames may move in the optical axis direction to move the lens groups in the optical axis direction.

Due to this structure, even in the case of a camera wherein an amount of movement of lens groups is large, such as a digital camera and a video camera, cam grooves provided on a cam member can be made short in the optical axis direction, and a camera can be made small in size, because not only lens group supporting frames but also the cam member and lens group supporting frames are protruded in the optical axis direction when protruding the zoom lens barrel from a camera main body.

(2) A zoom lens barrel wherein there are provided a plurality of lens groups, a plurality of lens group supporting frames each supporting each of the plural lens groups, a guide member which guides plural lens group supporting frames in the direction being in parallel with an optical axis, a cam member which moves plural lens group supporting frames in the direction being in parallel with an optical axis by the movement of the lens group in the direction being in parallel with an optical axis, and moves at least two lens supporting frames among plural lens group supporting frames by the rotation of the lens group around an optical axis, a fixed frame which is composed of a first guide portion which guides the cam member in the direction being in parallel with the optical axis and of a second guide portion which guides the cam member in the direction to rotate around the optical axis, and a driving member which drives the cam member.

(3) The zoom lens barrel described in the above item (2) wherein the first guide portion and the second guide portion both formed on the fixed frame mentioned above are continuous cam grooves engaging respectively with the cam member, (4) The zoom lens barrel described in the above item (3) wherein the first guide portion is a cam groove formed continuously in the direction for moving the cam member in the optical axis direction, and the second guide portion is a cam groove formed continuously in the direction for rotating the cam member without moving it substantially in the direction being in parallel with an optical axis.

(5) The zoom lens barrel described in the above item (4) wherein the cam groove of the first guide portion is a cam groove formed continuously in the direction which is mostly in parallel with an optical axis, and the cam groove of the second guide portion is a cam groove (6) The zoom lens barrel described in Item (3) wherein the first guide portion is a cam groove formed continuously in the direction for moving the cam member in the direction parallel to the optical axis direction and for rotating, and the second guide portion is a cam groove formed continuously in the direction for rotating the cam member without moving it substantially in the direction being in parallel with an optical axis.

(7) The zoom lens barrel described in Item (6) wherein a cam groove of the first guide portion is one formed continuously in the direction inclined to the optical axis, and a cam groove of the second guide portion is one formed continuously in the prescribed direction in the plane which is mostly perpendicular to the optical axis.

(8) The zoom lens barrel described in either one of Item (2)–Item (7) wherein the driving member is a rotating ring having a cam groove which engages with the cam member for transmitting driving force to the cam member.

(9) The zoom lens barrel described in Item (8) wherein a cam groove of the rotating ring is one which is formed continuously in the direction inclined to the optical axis for moving the cam member in the optical axis direction and for rotating it.

(10) The zoom lens barrel described in Item (8) wherein a cam groove of the rotating ring is one wherein a portion formed continuously in the direction inclined to an optical axis for the purpose of moving the cam member in the optical axis direction and a portion formed continuously in the optical axis direction for the purpose of rotating the cam member without moving it substantially in the optical axis direction are connected.

(11) The zoom lens barrel described in Item (7) wherein the driving member is a rotating ring having a cam groove which is formed continuously in the optical axis direction and engages with the cam member to transmit driving force to the cam member.

(12) The zoom lens barrel described in either one of Items (2)–(11), wherein the guide member has a straight guide portion for guiding straight in the direction which is almost in parallel with an optical axis.

(13) The zoom lens barrel described in either one of Items (2)–(12), wherein the plural lens group is a zoom lens composed of two lens groups.

(14) A camera having a zoom lens barrel described in either one of Items (2)–(13).

(15) A zoom lens barrel wherein there are provided a plurality of lens groups, a plurality of lens group supporting frames which respectively support the plural lens groups, a guide member which guides straight the plural lens group supporting frames in the optical axis direction, a cam member which moves the plural lens group supporting frames in the optical axis direction by the movement in the optical axis direction and moves at least two lens supporting frames among the plural lens group supporting frames in the optical axis direction by the rotation, a fixed frame fixed on a camera main body representing a cam groove which engages with a pin provided on the cam member and is composed of a first guide portion which guides the cam member in the optical axis direction and of a second guide portion which is connected with the first guide portion which guides the cam member around the optical axis, and a rotating ring having a cam groove which is provided with a portion which engages with the pin through the cam groove provided on the fixed frame and is formed continuously in the direction inclined to the direction of the optical axis provided to face the first guide portion for the purpose of moving the cam member in the optical axis direction and with a portion provided to face the second guide portion for the purpose of rotating the cam member without moving it substantially in the optical axis direction.

(16) A camera capable of being in the accommodated state in which a zoom lens barrel having therein plural lens groups is accommodated in the camera main body and in the state of ready for photographing in which the zoom lens barrel is protruded in the direction being in parallel with an optical axis, wherein there are provided a cam member which shifts the zoom lens barrel from the accommodated state to the state of ready for photographing, or from the state of ready for photographing to the accommodated state by the movement in the optical axis direction, and moves at least two lens groups in the optical axis direction so that they draw a prescribed locus by the rotation when the zoom lens barrel is in the state of ready for photographing, thereby to conduct prescribed zooming, and a fixed frame having a guide member which engages with the cam member and guides the movement of the cam member in the optical axis direction.

DETAILED DESCRIPTION OF THE INVENTION

Figure 1:
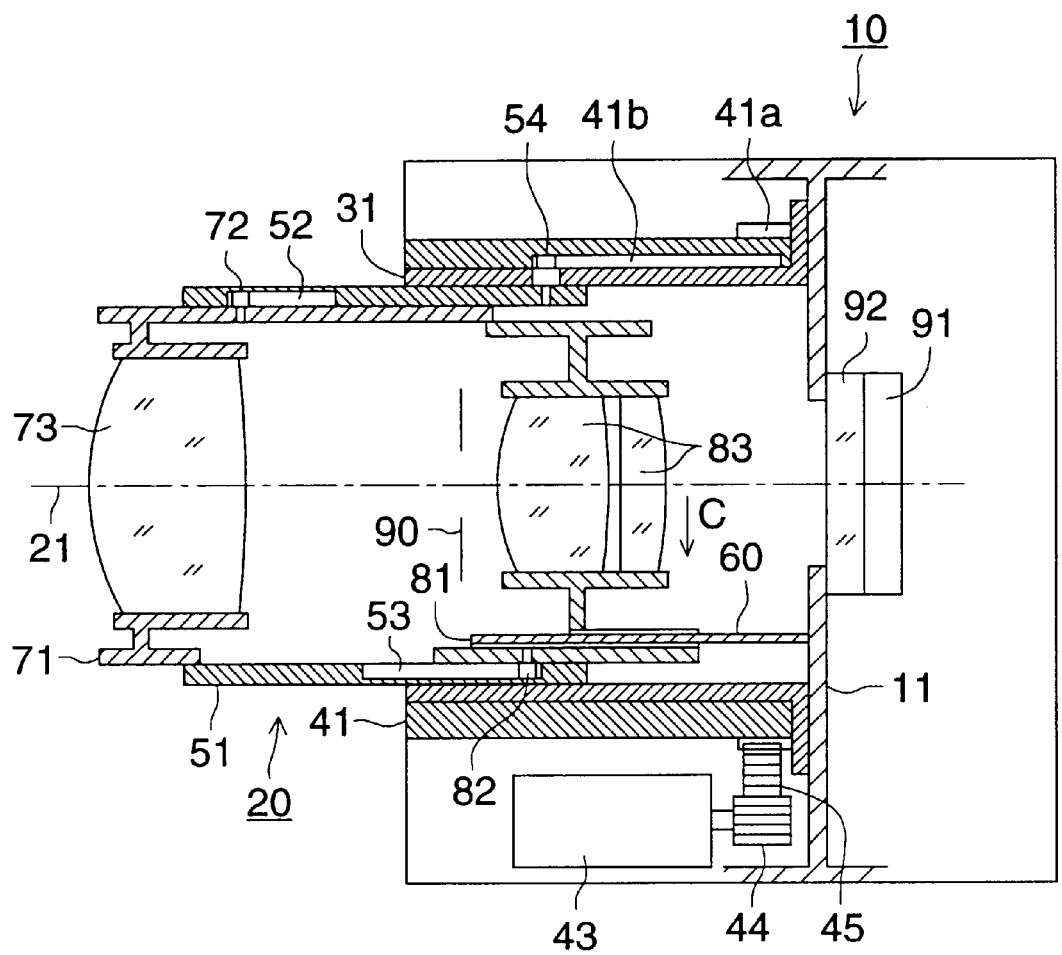
FIG. 1 is a sectional view of an optical axis of a zoom lens which is in the state of telephoto end position of a camera.

A camera having a zooming function of the invention is provided with a plurality of lens group, a fixed frame fixed on a main body of the camera, a cam member which is engaged with the fixed frame to be capable of moving in the direction of an optical axis of the lens group, and a plurality of lens group supporting frames each engaging with the cam member to be capable of moving in the direction of an optical axis of the lens group and supporting each of the plural lens groups. It is also possible to arrange so that a zoom lens barrel is provided with a plurality of lens group, a fixed frame fixed on a main body of the camera, a cam member which is engaged with the fixed frame to be capable of moving in the direction of an optical axis of the lens group, and a plurality of lens group supporting frames each engaging with the cam member to be capable of moving in the direction of an optical axis of the lens group and supporting each of the plural lens groups. Further, it is preferable that a cam member moves in the optical axis direction and thereby makes a plurality of lens group supporting frames to move in the optical axis direction, and it is preferable that a cam member rotates around an optical axis and thereby makes at least two lens group supporting frames among plural lens group supporting frames to move in the optical axis direction.

Incidentally, it is preferable that a cam member is a cam cylinder having on its inside a plurality of cam grooves, each of a plurality of lens group supporting frames has on its outside a cam pin, and each cam groove of the cam member is engaged with a cam pin on each of lens group supporting frames. It is also preferable that a plurality of lens group supporting frames move along the cam grooves on the cam member in the case of zooming.

Incidentally, it is also possible either to arrange so that only one lens group supporting frame among plural lens group supporting frames moves in the optical axis direction or to arrange so that plural lens group supporting frames move in the optical axis direction, in the case of zooming.

It is further preferable that that a camera or a zoom lens barrel has guide members which are fixed on a main body of the camera and guide a plurality of lens group supporting frames in the optical axis direction. As a guide member, there may be given a bar-shaped member elongated in the optical aid direction, a member having a groove elongated in the optical axis direction or a screw-shaped groove, and a member in a shape of a boss or a screw.

It is preferable that the fixed frame has therein a first guide portion which guides the cam member to move in the optical axis direction and a second guide portion which guides the cam member in the direction to rotate around the optical axis. The first guide portion and the second guide portion are preferably a groove such as a cam groove. In particular, a groove which passes through the fixed frame is preferable. Further, the first guide portion and the second guide portion which are provided continuously are preferable.

When the first guide portion and the second guide portion represent a groove, it is preferable that the cam member has on its outside a cam pin, and the first guide portion or the second guide portion is engaged with the cam pin on the cam member. Namely, it is preferable that a groove of the fixed frame is engaged with the cam pin on the cam member.

It is preferable that the cam member is moved in the optical axis direction along the first guide portion, and thereby a plurality of lens group supporting frames are moved in the optical axis direction, and the cam member is rotated around the optical axis along the second guide portion, and thereby, at least two lens group supporting frames among plural lens group supporting frames are moved in the optical axis direction.

As an example of a preferable embodiment, there is given an embodiment wherein a cam member is moved in the optical axis direction along the first guide portion, and thereby, plural lens group supporting frames held on the inside of the cam member are moved in the optical axis direction by the same movement of the cam members and a cam member is rotated along the second guide portion, and thereby, each of plural lens group supporting frames is moved in the optical axis direction along the cam groove of the cam member.

In short, the cam member is moved in the optical axis direction, and thereby, the state of accommodation of a zoom lens barrel of a camera and the state of ready for photographing are switched, and the camera member is rotated around the optical axis, and thereby, zooming is conducted. The state of accommodation in this case means that the state wherein a zoom lens barrel having a plurality of lens groups is accommodated in the camera main body. The state of ready for photographing represents the state wherein the zoom lens barrel is protruded in the optical axis direction.

In the case of zooming, it is preferable to move the lens group in the optical axis direction while changing an interval between lens groups. In a word, when moving at least two lens group supporting frames among plural lens group supporting frames in the optical axis direction by the rotation of the cam member around the optical axis, it is preferable to move them in the optical axis direction while changing the distance between the two lens group supporting frames.

Incidentally, when moving the cam member in the optical axis direction along the first guide portion (for example, when the state of accommodation and the state of ready for photographing are switched), the cam member may either be moved while it is rotated, or be moved without rotating it. Further, when the cam member is rotated by the second guide portion (for example, in the case of zooming), the cam member may either be rotated while it is moved, or be rotated without moving it.

However, it is preferable that an amount of movement of the cam member in the optical axis direction along the first guide portion is greater than that of movement of the cam member in the optical axis direction along the second guide portion. It is also preferable that an amount of rotation of the cam member around the optical axis along the second guide portion is greater than that of rotation of the cam member around the optical axis along the first guide portion.

Incidentally, these movements can be determined by shapes of the first guide portion and the second guide portion (for example, a shape of a groove).

For example, in the case of moving the cam member without rotating it, when moving the cam member in the optical axis direction along the first guide portion, it is possible to make a groove formed continuously in the optical axis direction to be the first guide portion. In the case of rotating the cam member without moving it in the optical axis direction when rotating the cam member along the second guide portion, it is possible to make a groove formed continuously in the direction perpendicular to the optical axis to be the second guide portion. In the case of also rotating the cam member when moving the cam member in the optical axis direction along the first guide portion, it is possible to make a groove formed continuously in the direction inclined to the optical axis to be the first guide portion. In the case of moving the cam member also in the optical axis direction when rotating the cam member along the second guide portion, it is possible to make a groove formed continuously in the direction inclined to the direction perpendicular to the optical axis to be the second guide portion.

It is preferable that a camera or a zoom lens barrel has a driving member which drives a cam member.

A driving member which is a member capable of rotating is preferable. For example, a rotating ring or a rotating cylinder may be given.

Incidentally, it is preferable that a driving member has a groove such as a cam groove, and a cam member has a cam pin, and the cam groove on the driving member is engaged with the cam pin on the cam member. Incidentally, as an example of a preferable embodiment, there is given a structure wherein a cam member holds on its inside a lens group supporting frame, a fixed frame holds on its inside a cam member, and a driving member holds on its inside a fixed frame. In that case, it is preferable that the structure is one wherein each of plural cam grooves inside the cam member is engaged with a cam pin on each of plural lens group supporting frames, the first and second guide portions on the fixed frame represent a groove which passes through the fixed frame, a cam pin provided on the outside of the cam member is engaged with a groove on the fixed frame and is further engaged with a groove provided inside a driving member.

It is further preferable that the driving member is engaged with a cam member, and when the driving member rotates, the cam member is moved in the optical axis direction along the first guide portion, and when the driving member further rotates, the cam member is rotated around the optical axis along the second guide portion. In other words, it can be said that a region for the driving member to rotate has a first region where the state of accommodation and the state of ready for photographing are switched and a second region for zooming, and the first region and the second region are connected by the continued same rotation. Since this structure makes it possible that both the movement in the optical direction of the cam member along the first guide portion and the rotation of the cam member around the optical axis along the second guide portion can be can be conducted only by the rotation of the driving member, only one power source for rotating the driving member can conduct both switching between the state of accommodation and the state of protrusion and zooming, which is preferable. In a word, it is possible to reduce the number of power sources. As a power source, a motor can be given. The motor can either be provided on a camera main body or be provided on a zoom lens barrel.

Incidentally, a camera of the invention can be used as a camera for a silver halide film, a digital still camera and a video camera and in the case of a digital still camera and a video camera having a photoelectric transfer image pickup element wherein an amount of movement of a lens group is relatively large, an effect of miniaturizing a camera is remarkable, which is preferable. Incidentally, as a photoelectric transfer image pickup element, CCD and CMOS may be given.

Plural lens groups may also be three or more lens groups, but it is preferable to be composed of two lens groups. A lens group which is nearest to a subject among plural lens groups may either be a positive lens group or a negative lens group, and when it is a negative one, the movement of the lens group in zooming is complicated and a helicoid can not be used. Therefore, the effect of the invention is remarkable, which is preferable. Incidentally, a lens group means a group of one or plural lenses which conduct the same movement when moving in the optical axis direction.

An embodiment of the invention will be shown more concretely as follows.

An example of a zoom lens barrel related to the invention and a camera employing this barrel will be explained as follows, referring to the drawings.

Figure 2:
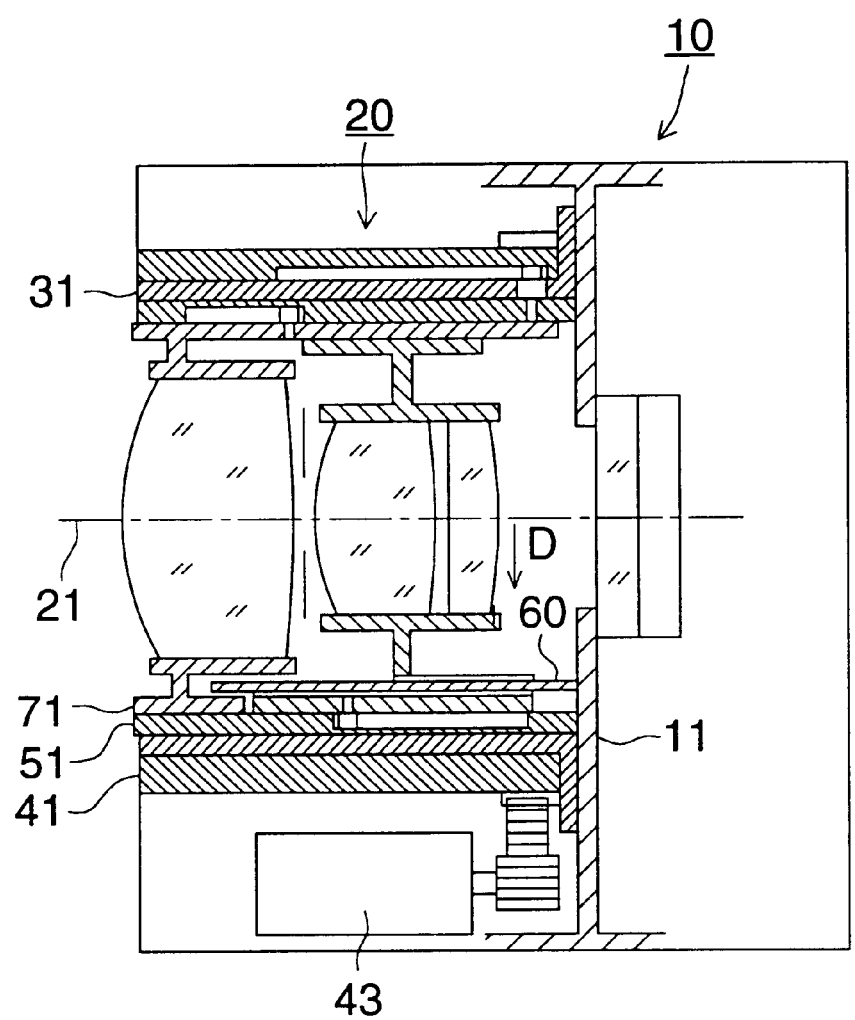
FIG. 2 is a sectional view of an optical axis of a zoom lens which is in the state where a lens barrel of a camera is accommodated.
Figure 3:
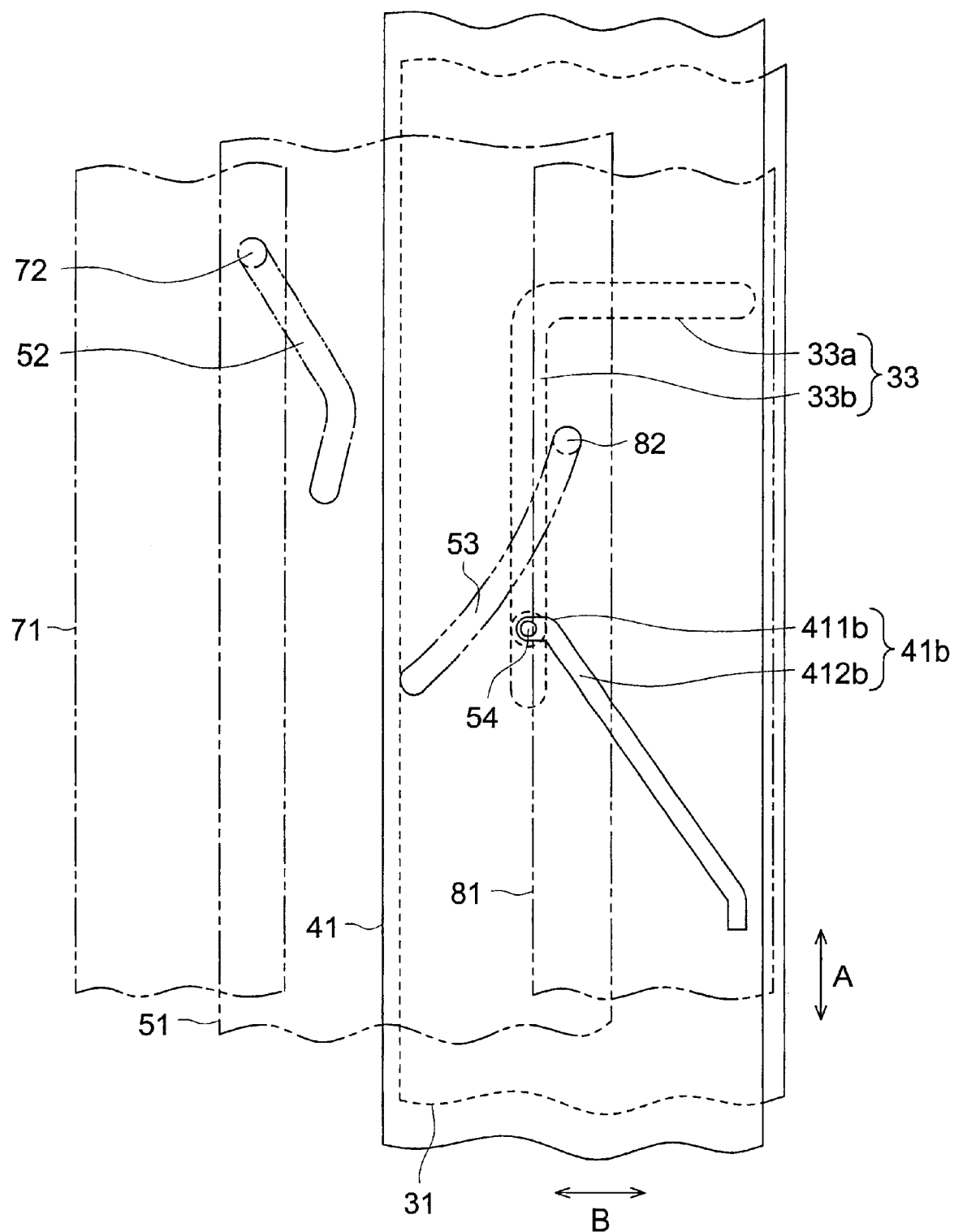
FIG. 3 is an exploded view showing the relationship between a cam groove and a pin at the wide angle end position of the zoom lens barrel shown in FIG. 1.
Figure 4:
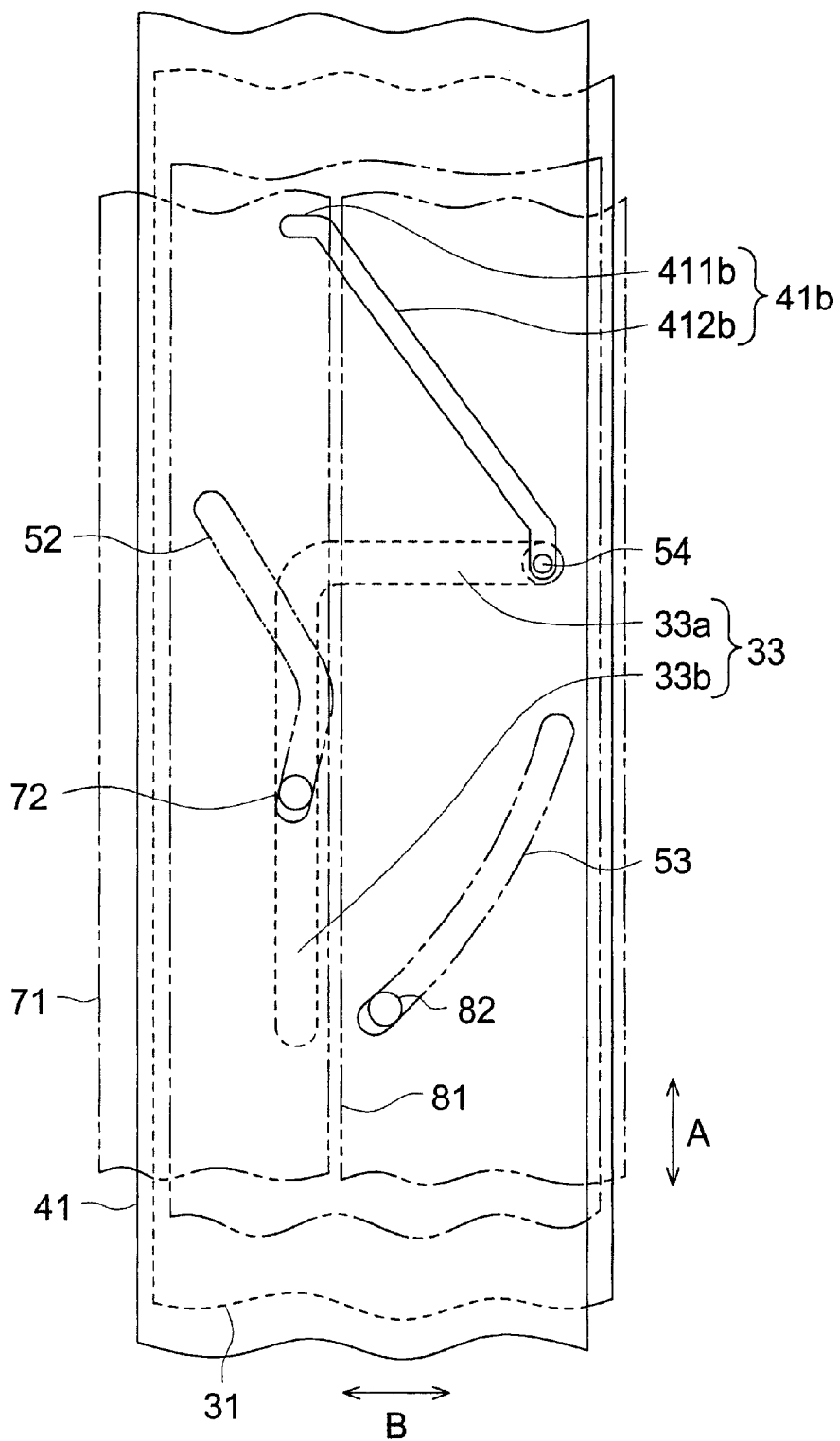
FIG. 4 is an exploded view showing the relationship between a cam groove and a pin at the position where the zoom lens barrel shown in FIG. 2 is accommodated.

FIG. 1 is a sectional view of an optical axis of a zoom lens which is in the state of wide angle end position of a camera, FIG. 2 is a sectional view of an optical axis of a zoom lens which is in the state where a lens barrel of a camera is accommodated, FIG. 3 is an exploded view showing the relationship between a cam groove and a pin at the wide angle end position of the zoom lens barrel shown in FIG. 1, and FIG. 4 is an exploded view showing the relationship between a cam groove and a pin at the position where the zoom lens barrel shown in FIG. 2 is accommodated.

As shown in FIGS. 1–4, camera 10 is a camera wherein zoom lens barrel 20 can be accommodated in camera main body 11. The zoom lens barrel 20 is a two-group zoom lens which has the state of zooming in which two lens groups including first lens group 73 and second lens group 83 are moved to draw a prescribed locus on optical axis 21 and the state of accommodation in which the lens groups are accommodated from the state of photographing.

Fixed frame 31 is fixed on camera main body 11, and its inner circumference is engaged with cam portion 51, and its outer circumference is engaged with rotating ring 41. Further, on the fixed frame 31, there is provided cam groove 33 (FIGS. 3 and 4) which engages with cam member 51. This cam groove 33 is composed of first cam groove 33a representing the first guide portion and second cam groove 33b representing the second guide portion. The first cam groove 33a and the second cam groove 33b are connected with each other continuously. To be more precise, the first cam groove 33a is a groove formed continuously in the direction to move cam member 51 in the optical axis direction. The second cam groove 33b is a groove formed continuously in the direction which is mostly perpendicular to the direction of the first cam groove 33a, and is a groove formed continuously in the direction to rotate cam member 51 without moving it substantially in the optical axis direction.

On the rotating ring 41 representing a driving member, there is formed cam groove 41b (FIGS. 3 and 4) which is engaged with pin 54 provided on the cam member 51. This cam groove 41b of the rotating ring 41 is a groove wherein a portion of cam groove 412b formed continuously in the direction inclined to optical axis 21 for the purpose of moving the cam member 51 in the direction being in parallel with optical axis 21, and a portion of groove 411b formed continuously in the direction being in parallel with optical axis 21 for the purpose of rotating the cam member 51 without moving it substantially in the direction being in parallel with optical axis 21, are connected with each other continuously. Incidentally, a variation of the cam groove 41b of rotating ring 41 may also be a cam groove formed continuously only in the direction inclined to an optical axis for the purpose of moving the cam member 51 in the direction being in parallel with an optical axis and for rotating it.

This rotating ring 41 is rotated by driving source (motor) 43 through gear section 41a, gear 44 and gear 45. Due to the rotation of the rotating ring 41, the cam member 51 is rotated around optical axis 21 by cam groove 41b provided on the rotating ring 41 through pin 54 which is engaged with cam groove 41b, and the cam member 51 is also moved in the direction being in parallel with optical axis 21.

The cam member 51 is composed of pin 54, cam groove 52 and cam groove 53. Further, the cam member 51 rotates around optical axis 21 in the zooming region, and it moves in the direction being in parallel with optical axis 21 in the region of accommodation.

Guide member 60 is fixed on camera main body 11 as shown in FIG. 1, in which three members are provided to be in parallel with optical axis 21, and it has a guide portion for straight advancement which guides second lens supporting frame 81 described later for its straight advancement.

First lens group 73 and pin 72 are formed on first lens supporting frame 71, and the pin 72 is engaged with cam groove 52. The first lens supporting frame 71 is guided by guide member 60 in the direction being in parallel with optical axis 21.

Second lens group 83 and pin 82 are formed on second lens supporting frame 81, and the pin 82 is engaged with cam groove 53. The second lens supporting frame 81 is guided by guide member 60 in the direction being in parallel with optical axis 21.

This two-group zoom lens is of an inner focus type to conduct focusing with second lens group 83. Incidentally, the numeral 92 represents an optical block such as a filter and a CCD cover glass, 92 represents CCD and 90 represents a diaphragm or a shutter provided to be closer to a subject than the second lens group.

Now, accommodation operations from the wide angle end position of the zoom lens barrel will be explained. When motor 43 rotates first, rotating ring 41 rotates through gear section 41a, gear 44 and gear 45. Then, pin 54 engaged with groove 411b formed on the rotating ring 41 is moved. The pin 54 is also engaged with fixed cam groove 33b, and rotates cam member 51 around an optical axis. Then, cam grooves 52 and 53 formed on the cam member rotate, and pins 72 and 82 each being engaged with a cam groove move first lens supporting frame 71 and second lens supporting frame 81 from the wide angle end position to the telephoto end position. Further, when the rotating ring 41 is rotated, pin 54 moves along cam groove 412b, and the pin 54 which is engaged also with fixed, cam groove 33a moves the cam member 51 in the direction being in parallel with an optical axis. Then, pin 72 and pin 82 engaging respectively with cam grooves 52 and 53 formed on the cam member 51 move respectively first lens supporting frame 71 and second lens supporting frame 81 from the telephoto end position to the position of accommodation, thus, the zoom lens barrel is accommodated in the camera main body.

Figure 5:
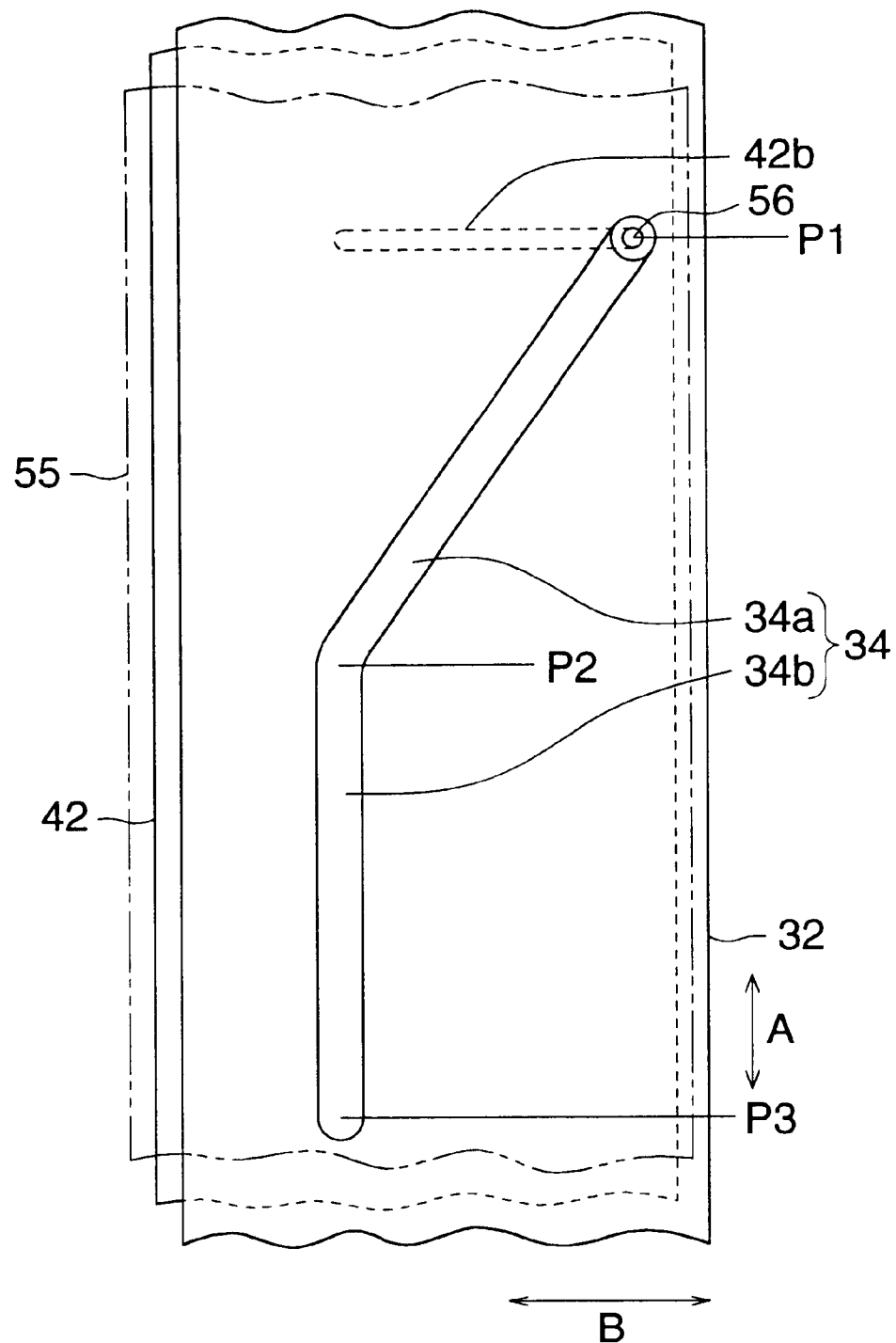
FIG. 5 is an exploded view showing the relationship between a cam groove and a pin at the position where another zoom lens barrel is accommodated.
Figure 6:
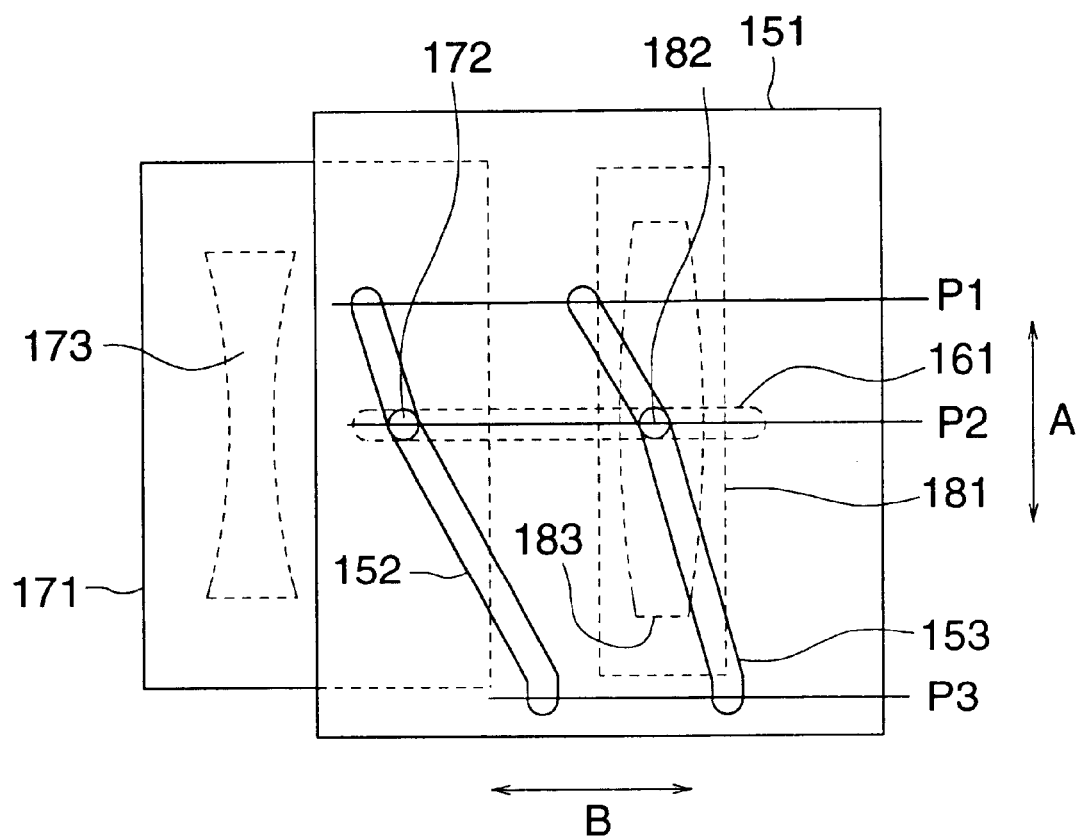
FIG. 6 is an exploded view showing the relationship between a cam groove and a pin in a zoom lens barrel in a conventional example.

Now, another example of the zoom lens barrel will be explained. FIG. 5 is an exploded view showing the relationship between a cam groove and a pin in another zoom lens barrel.

As shown in FIG. 5, cam member 55 moves an unillustrated lens supporting frame in the optical axis direction. On rotating ring 42, there is provided cam groove 42b elongated in the optical axis direction. Pin 56 provided on cam member 55 is engaged with cam groove 42b provided on rotating ring 42.

On fixed frame 32, there is formed cam groove 34 having therein a first guide portion and a second guide portion. First cam groove 34a representing the first guide portion is a groove formed continuously in the direction inclined to arrow mark B which is in parallel with an optical axis, and second cam groove 34b representing the second guide portion is a groove formed continuously in the prescribed direction in the plane which is mostly perpendicular to arrow mark B. Pin 56 is engaged also with fixed cam groove 34 of fixed frame 32, and when rotating ring 42 is rotated in the direction of arrow mark A, the cam member 55 is guided by the cam groove 34 to move in the direction of arrow mark B. Cam groove 34a conducts accommodating operations with its position P1 and position P2, while, cam groove 34b conducts zooming operations with its position P2 and position P3.

Though the two-group zoom lens barrel has been explained in the embodiment stated above, the invention is not limited to this two-group zoom lens barrel, and a three-group zoom lens or a four-group zoom lens may also be accepted.

Though an inner focus type wherein focusing is conducted by the second lens group of the two-group zoom lens has been explained in the embodiment stated above, the focusing can also be conducted by another lens group. The invention is not limited to the inner focus type of this type.

Due to the constitution stated above, the following effects are brought. In the zooming region, rotation of a cam member around an optical axis moves a lens group in the optical axis direction, and in the accommodating region, movement of the cam member in the direction being in parallel with an optical axis moves the lens group in the optical axis direction. Therefore, it is possible to provide a zoom lens barrel for a camera which can be made small in size with a simple structure, and can conduct a change a focal distance of a lens system and an operation of accommodation.

Further, application of the aforesaid zoom lens barrel to a camera makes it easy to accommodate a zoom lens in a camera main body, which results in a camera excellent in portability.

Disclosed embodiment can be varied by a skilled person without departing from the spirit and scope of the invention.

What is claimed is:

1. A camera having a zooming function, comprising:
   a plurality of lens groups;
   a fixed frame fixed to a main body of said camera;
   a cam member engaging with said fixed frame so that said cam member is movable in the optical axis direction of said lens groups; and
   a plurality of lens group supporting frames each engaging with said cam member and supporting each of said plurality of said lens groups so that said plurality of lens group supporting frames are movable in the optical axis direction to move said lens groups in the optical axis direction;
   wherein said cam member moves in said optical axis direction so as to move said plurality of lens group supporting frames in said optical axis direction; and said cam member rotates around the optical axis so as to move at least one of said plurality of lens group supporting frames in said optical axis direction; and
   wherein said fixed frame further includes:
      a first guide portion for guiding said cam member to move in said optical axis direction; and
      a second guide portion for guiding said cam member to rotate around said optical axis;
      wherein said cam member is moved along said first guide portion in said optical axis direction so that said plurality of lens group supporting frames are moved in said optical axis direction; and said cam member is rotated along said second guide portion around said optical axis so that at least one of said plurality of lens group supporting frames is moved in said optical axis direction.

2. The camera of claim 1, wherein a distance between at least two of said plurality of lens group supporting frames varies when said cam member moves around said optical axis so as to move at least one of said plurality of lens group supporting frames in said optical axis direction.

3. The camera of claim 1, wherein said cam member moves in said optical axis direction so that said camera is switched between accommodated state in which said plurality of lens groups are accommodated in said main body and state of ready for photographing in which said plurality of lens groups are protruded in said optical axis direction; and said cam member rotates around said optical axis so that said camera performs a zooming action for changing a view angle of said camera.

4. The camera of claim 1, wherein said cam member is moved along said first guide portion in said optical axis direction so that said camera is switched between accommodated state in which said plurality of lens groups are accommodated in said main body and state of ready for photographing in which said plurality of lens groups are protruded in said optical axis direction; and said cam member is rotated along said second guide portion around said optical axis so that said camera performs a zooming action for changing a view angle of said camera.

5. The camera of claim 1, wherein said first guide portion is continued to said second guide portion.

6. The camera of claim 1, wherein a moving amount of said cam member when said cam member is moved along said first guide portion in said optical axis direction is larger than a moving amount of said cam member when said cam member is moved along said second guide portion in said optical axis direction; and a rotating amount of said cam member when said cam member is rotated along said second guide portion around said optical axis is larger than a rotating amount of said cam member when said cam member is rotated along said first guide portion around said optical axis.

7. The camera of claim 6, wherein said cam member does not rotate when said cam member is moved along said first guide portion in said optical axis direction.

8. The camera of claim 7, wherein said first guide portion is a cam groove elongated in said optical axis direction.

9. The camera of claim 6, wherein said cam member does not move in said optical axis direction when said cam member is rotated along said second guide portion.

10. The camera of claim 9, wherein said second guide portion is a cam groove elongated in a direction perpendicular to said optical axis direction.

11. The camera of claim 1, further comprising a guide member, fixed to said main body of said camera, for guiding said plurality of lens group supporting frames to move in said optical axis direction.

12. The camera of claim 1, further comprising a driving means for driving said cam member.

13. The camera of claim 12, wherein said driving means is a rotatable member; said driving means engages with said cam member; said cam member is moved along said first guide portion in said optical direction by rotation of said driving means; and said cam member is rotated along said second guide portion around said optical axis by rotation of said driving means.

14. The camera of claim 13, wherein said driving means includes a cam groove; said cam member includes a cam pin; and said cam groove of said driving means engages with said cam pin of said cam member.

15. The camera of claim 1, wherein said cam member includes a cam groove; said plurality of lens group supporting frames have a cam pin; and said cam groove of said cam member engages with said cam pin of said plurality of lens group supporting frames.

16. The camera of claim 1, wherein said cam member includes a cam pin; said first guide portion and said second guide portion are cam grooves; and one of said first guide portion and said second guide portion engages with said cam pin of said cam member.

17. The camera of claim 1, wherein said camera is a digital camera including a photoelectric transfer image pickup element.

18. The camera of claim 1, wherein said plurality of lens groups are composed of two lens groups.

19. The camera of claim 1, wherein a lens group, being closest to an object to be photographed, of said plurality of lens groups is a negative lens group.

20. A camera having a zooming function, comprising:
a plurality of lens groups;
a fixed frame fixed to a main body of said camera;
a cam member engaging with said fixed frame so that said cam member is movable in the optical axis direction of said lens groups; and
a plurality of lens group supporting frames each engaging with said cam member and supporting each of said plurality of said lens groups so that said plurality of lens group supporting frames are movable in the optical axis direction to move said lens groups in the optical axis direction;
wherein said cam member moves in said optical axis direction so as to move said plurality of lens group supporting frames in said optical axis direction; and said cam member rotates around the optical axis so as to move at least one of said plurality of lens group supporting frames in said optical axis direction;
wherein said fixed frame further includes:
a first guide portion for guiding said cam member to move in said optical axis direction; and
a second guide portion for guiding said cam member to rotate around said optical axis;
wherein said cam member is moved along said first guide portion in said optical axis direction so that said plurality of lens group supporting frames are moved in said optical axis direction; and said cam member is rotated along said second guide portion around said optical axis so that at least one of said plurality of lens group supporting frames is moved in said optical axis direction;
wherein a moving amount of said cam member when said cam member is moved along said first guide portion in said optical axis direction is larger than a moving amount of said cam member when said cam member is moved along said second guide portion in said optical axis direction; and a rotating amount of said cam member when said cam member is rotated along said second guide portion around said optical axis is larger than a rotating amount of said cam member when said cam member is rotated along said first guide portion around said optical axis; and
wherein said cam member rotates when said cam member is moved along said first guide portion in said optical axis direction.

21. The camera of claim 20, wherein said first guide portion is a cam groove elongated in an inclined direction in relation to said optical axis direction.

22. A camera having a zooming function, comprising:
a plurality of lens groups;
a fixed frame fixed to a main body of said camera;
a cam member engaging with said fixed frame so that said cam member is movable in the optical axis direction of said lens groups; and
a plurality of lens group supporting frames each engaging with said cam member and supporting each of said plurality of said lens groups so that said plurality of lens group supporting frames are movable in the optical axis direction to move said lens groups in the optical axis direction,
wherein said cam member moves in said optical axis direction so as to move said plurality of lens group supporting frames in said optical axis direction; and said cam member rotates around the optical axis so as to move at least one of said plurality of lens group supporting frames in said optical axis direction;
wherein said fixed frame further includes:
a first guide portion for guiding said cam member to move in said optical axis direction; and
a second guide portion for guiding said cam member to rotate around said optical axis;
wherein said cam member is moved along said first guide portion in said optical axis direction so that said plurality of lens group supporting frames are moved in said optical axis direction; and said cam member is rotated along said second guide portion around said optical axis so that at least one of said plurality of lens group supporting frames is moved in said optical axis direction;
wherein a moving amount of said cam member when said cam member is moved along said first guide portion in said optical axis direction is larger than a moving amount of said cam member when said cam member is moved along said second guide portion in said optical axis direction; and a rotating amount of said cam member when said cam member is rotated along said second guide portion around said optical axis is larger than a rotating amount of said cam member when said cam member is rotated along said first guide portion around said optical axis; and wherein said cam member moves in said optical axis direction when said cam member is rotated along said second guide portion.

23. The camera of claim 22, wherein said second guide portion is elongated in an inclined direction in relation to a direction perpendicular to said optical axis direction.

24. A zooming lens barrel, comprising:
   a plurality of lens groups;
   a fixed frame fixed to a main body of a camera to which said zooming lens barrel is attached;
   a cam member engaging with said fixed frame so that said cam member is movable in the optical axis direction of said lens groups; and
   a plurality of lens group supporting frames each engaging with said cam member and supporting each of said plurality of said lens groups so that said plurality of lens group supporting frames are movable in the optical axis direction to move said lens groups in the optical axis direction;

wherein said cam member moves in said optical axis direction so as to move said plurality of lens group supporting frames in said optical axis direction; and said cam member rotates around the optical axis so as to move at least one of said plurality of lens group supporting frames in said optical axis direction; and wherein said fixed frame further includes:
   a first guide portion for guiding said cam member to move in said optical axis direction; and
   a second guide portion for guiding said cam member to rotate around said optical axis;
   wherein said cam member is moved along said first guide portion in said optical axis direction so that said plurality of lens group supporting frames are moved in said optical axis direction; and said cam member is rotated along said second guide portion around said optical axis so that at least one of said plurality of lens group supporting frames is moved in said optical axis direction.

\* \* \* \* \*